United States Patent
Versleegers

(10) Patent No.: US 6,219,314 B1
(45) Date of Patent: *Apr. 17, 2001

(54) DISC CHANGER WITH ROTATABLE DISC SUPPORT AND DISC PLAYER INCLUDING THE DISC CHANGER

(75) Inventor: Jozef C. M. Versleegers, Bree (BE)

(73) Assignee: U.S. Phillips Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/102,476

(22) Filed: Jun. 22, 1998

(51) Int. Cl.[7] .............................. G11B 17/22; G11B 33/02
(52) U.S. Cl. .............................................. 369/37; 369/75.1
(58) Field of Search .............................. 369/37, 191, 192, 369/75.1, 75.2; 360/98.06

(56) References Cited

U.S. PATENT DOCUMENTS

| | | | |
|---|---|---|---|
| 5,193,079 | * | 3/1993 | Ko et al. .................................. 369/37 |
| 5,197,056 | * | 3/1993 | Van Heusden et al. ............... 369/37 |
| 5,293,362 | * | 3/1994 | Sakurai .................................... 369/30 |
| 5,422,869 | * | 6/1995 | Versleegers ............................. 369/37 |
| 5,771,213 | * | 6/1998 | Koshino et al. ....................... 369/37 |
| 5,867,459 | * | 2/1999 | Versleegers ............................. 369/37 |

FOREIGN PATENT DOCUMENTS 5-182339 * 7/1996 (JP) .

* cited by examiner

Primary Examiner—Brian E. Miller
Assistant Examiner—Kenneth W Fields
(74) Attorney, Agent, or Firm—Michael E. Belk

(57) ABSTRACT

A disc changer for bringing disc-shaped information carriers into and out of a position. The disc changer includes a supporting body and a disc-shaped disc which is supported by the supporting body, is arranged to be movable relative to the body, and is rotatable about an axis of rotation. The disc support has supporting surfaces for the information carriers and further includes a first toothed ring which extends around the axis of rotation and is not rotatable relative to the disc support, which toothed ring is adapted to cooperate with a second toothed ring which is not rotatable relative to the supporting body. The second toothed ring extends around an axis of the supporting body, which axis extends parallel to and at a distance from the axis of rotation. The disc changer further includes a drive member which is rotatable about the axis of the supporting body, the disc support being rotatably connected to the drive member at the location of the axis of rotation, for rotating and guiding the disc support.

8 Claims, 7 Drawing Sheets

DISC CHANGER WITH ROTATABLE DISC SUPPORT AND DISC PLAYER INCLUDING THE DISC CHANGER

BACKGROUND OF THE INVENTION

The invention relates to a disc changer for bringing disc-shaped information carriers into and out of a position, which disc changer comprises a supporting body and a disc-shaped disc support, which is supported by the supporting body, is arranged to be movable relative to said body, and is rotatable about an axis of rotation, which disc support has supporting surfaces for said information carriers and further comprises a first toothed ring which extends around said axis of rotation and is not rotatable relative to the disc support, which toothed ring is adapted to cooperate with a second toothed ring which extends around an axis of the supporting body, which axis of the supporting body extends parallel to and at a distance from the axis of rotation, means being provided for rotating and guiding the disc support.

The invention further relates to a disc player comprising a scanning device having means for inscribing and/or reading disc-shaped information carriers and further having a turntable which is rotatable about an axis of rotation, for supporting an information carrier which is in a scanning position, and a disc changer for moving said information carriers into and out of the position related to the scanning position.

A disc player with an integrated disc changer is known from JP-A 5-182337. The known player has a housing and a drawer which is movable into and out of the housing and is supported in the frame, which drawer is constructed as a disc changer. The housing accommodates a scanning device with an optical unit for scanning a Compact Disc and a turntable for supporting and rotating the Compact Disc. The drawer has a supporting body carrying a disc-shaped disc support with three supporting surfaces for Compact Discs. The disc support has a peripheral edge whose shape differs from a circular shape and having three flattened edge portions which extend from one supporting surface to another supporting surface. The disc changer thus formed is rotatable relative to the supporting body. For this purpose the drawer has a toothed driving wheel in mesh with a toothed ring of the disc support, a rotatable guide disc with an eccentric guide shaft and fixed guide walls. The toothed driving wheel and the guide disc, which is freely rotatable relative to the toothed wheel, are both rotatable about a common shaft which is fixed relative to the supporting body. The eccentric guide shaft extends through a central opening in the disc support, the guide walls cooperating with the peripheral edge of the disc support. A disadvantage of the known disc changer is that it requires a comparatively large number of parts to realise the desired movements of the disc support. Moreover, the comparatively large toothed driving wheel occupies much space, which is undesirable in modern compact equipment. The guide walls needed in the known disc changer serve to keep the disc changer in a desired path during rotation and in desired end positions in a condition of rest. A disadvantage of the construction using a toothed driving wheel and a freely rotatable guide disc is that despite the fixed guide walls no accurately defined end positions are possible owing to the possibility of rotation of the toothed wheel and the guide disc relative to one another and the presence of play between the peripheral edge of the disc support and the fixed guide walls. In the known disc player the end positions are detected by detection means, as disclosed in JP-A 5-182339. Another disadvantage of the guide construction used in the known disc changer is that rotation of the disc support produces relatively much noise and the play in the end positions of the disc changer is so large that the disc support is movable over a considerable range.

SUMMARY OF THE INVENTION

It is one of the objects of the invention to provide a compact disc changer of the type defined in the opening paragraph, having simple means for a well-defined movement of the disc support and for maintaining the disc support in well-defined positions.

The disc changer in accordance with the invention is characterised in that the second toothed ring is a toothed ring which is not rotatable relative to the disc support and which is in mesh with the first toothed ring of the disc support, said means for rotating and guiding the disc support comprising a drive member which is rotatable about said axis of the supporting body, to which drive member the disc support is rotatably connected at the location of the axis of rotation. This results in an at least substantially play-free construction. A further advantage of the disc changer in accordance with the invention is that the drive member used therein defines any position which can be occupied by the disc support, as a result of which the disc support can only perform well-defined movements and occupy well-defined positions. Another advantage is the small number of parts required to rotate and guide the disc support and to ensure stable positions of this support.

An embodiment of the disc changer in accordance with the invention is characterised in that the first toothed ring of the disc support has outer teeth and the second toothed ring of the supporting body has inner teeth. The principal advantage of this embodiment is that the disc changer can have a small overall height.

An embodiment of the disc changer in accordance with the invention is characterised in that the number of outer teeth is in a ratio of 3:4 to the number of inner teeth, the distance between the axis of rotation of the disc support and said axis of the supporting body being equal to half the difference between the pitch diameters of the two toothed rings. In this embodiment one revolution of the drive member produces one third revolution of the disc support in the opposite direction of rotation. In this embodiment the disc support preferably has three contiguous or substantially contiguous supporting surfaces, in which case the transverse dimensions of the disc support can be at least twice the diameter of the information discs to be supported.

An embodiment of the disc changer in accordance with the invention is characterised in that the first toothed ring has inner teeth and the second toothed ring has outer teeth, the number of inner teeth being in a ratio of 3:2 to the number of outer teeth, the distance between the axis of rotation of the disc support and said axis of the supporting body being equal to half the difference between the pitch diameters of the two toothed rings. An advantage of this embodiment, which is a variant of the preceding embodiment, is that one revolution of the drive member produces one third revolution of the disc support in the opposite direction of rotation. This embodiment is also suitable for supporting three disc-shaped information carriers on a disc support of minimal dimensions.

It is another object of the invention to provide a silent changer whose operation is accurate and which is yet of a simple construction.

The disc player in accordance with the invention comprises a scanning device having means for inscribing and/or reading disc-shaped information carriers and further having a turntable which is rotatable about an axis of rotation, for supporting an information carrier which is in a scanning position, and the disc changer in accordance with the invention, for moving said information carriers into and out of the position related to the scanning position. An advantage of the disc player in accordance with the invention is that in operation the disc support is moved silently and in a well-defined manner, information discs situated on the supporting surfaces being brought into well-defined positions relative to the scanning device. This results in an efficiently operating disc player, requiring only a short time to move an information disc to the turntable or to change an information disc to be scanned. The disc changer may be integrated in the disc player, the scanning device extending for example underneath the disc support and being supported in or relative to the supporting body, the scanning device and the disc support being movable towards and away from each other viewed along the axis of rotation. The information discs can simply be lowered onto the supporting surfaces of the disc support.

An embodiment of the disc player in accordance with the invention is characterised in that the supporting body of the disc changer forms part of a drawer which is movable into and out of a housing. In a slid-out position of the drawer two or three information discs can be placed onto and/or removed from the disc support depending on the extent to which the drawer has been pulled out. The drawer may also accommodate the scanning device.

BRIEF DESCRIPTION OF THE DRAWINGS

The invention will be described in more detail, by way of example, with reference to the drawings, in which.

DESCRIPTION OF THE PREFERRED EMBODIMENT

Figure 1:
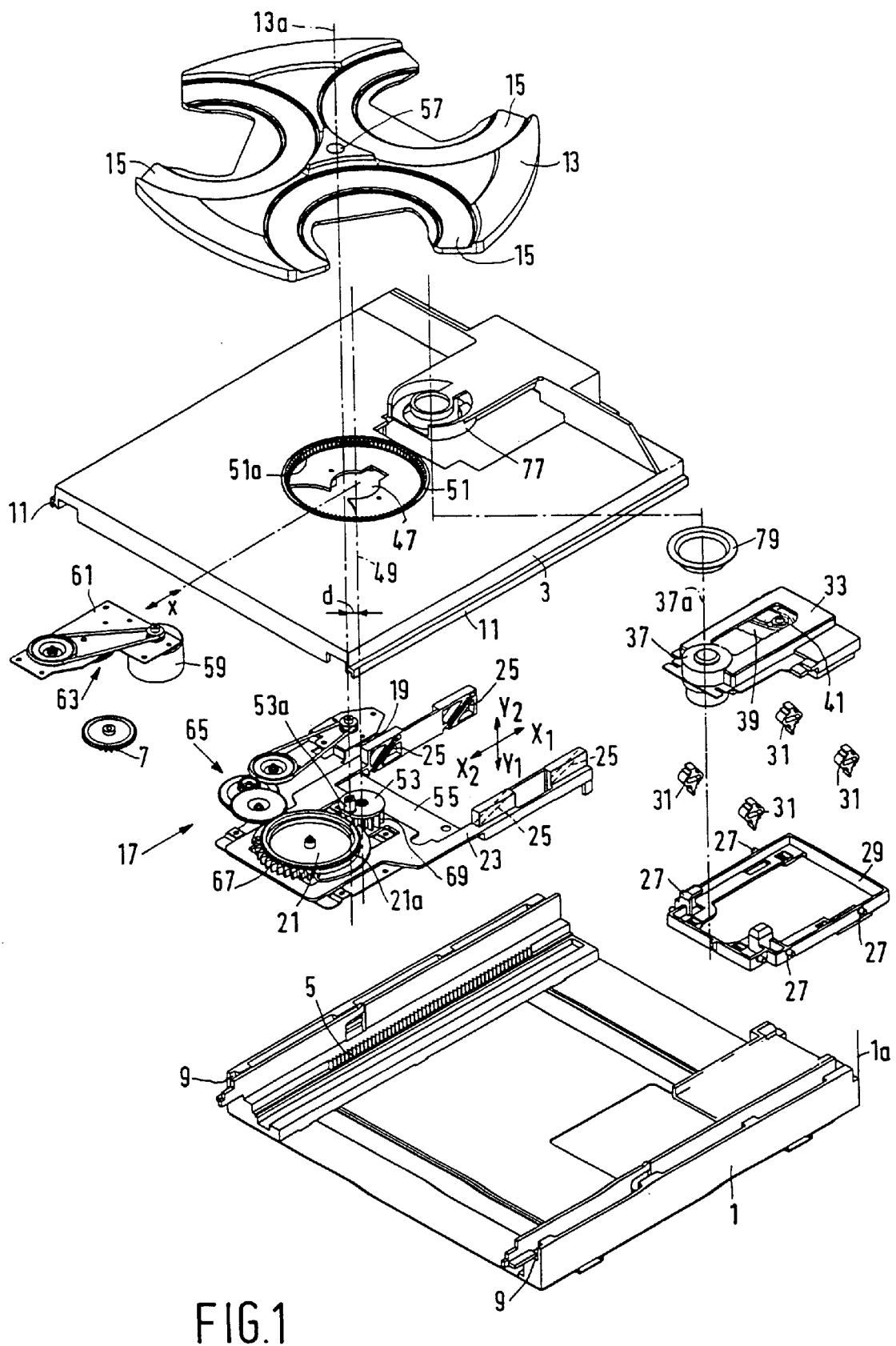
FIG. 1 is an exploded view showing an embodiment of the disc player in accordance with the invention, including an integrated first embodiment of the disc changer in accordance with the invention.
Figure 2:
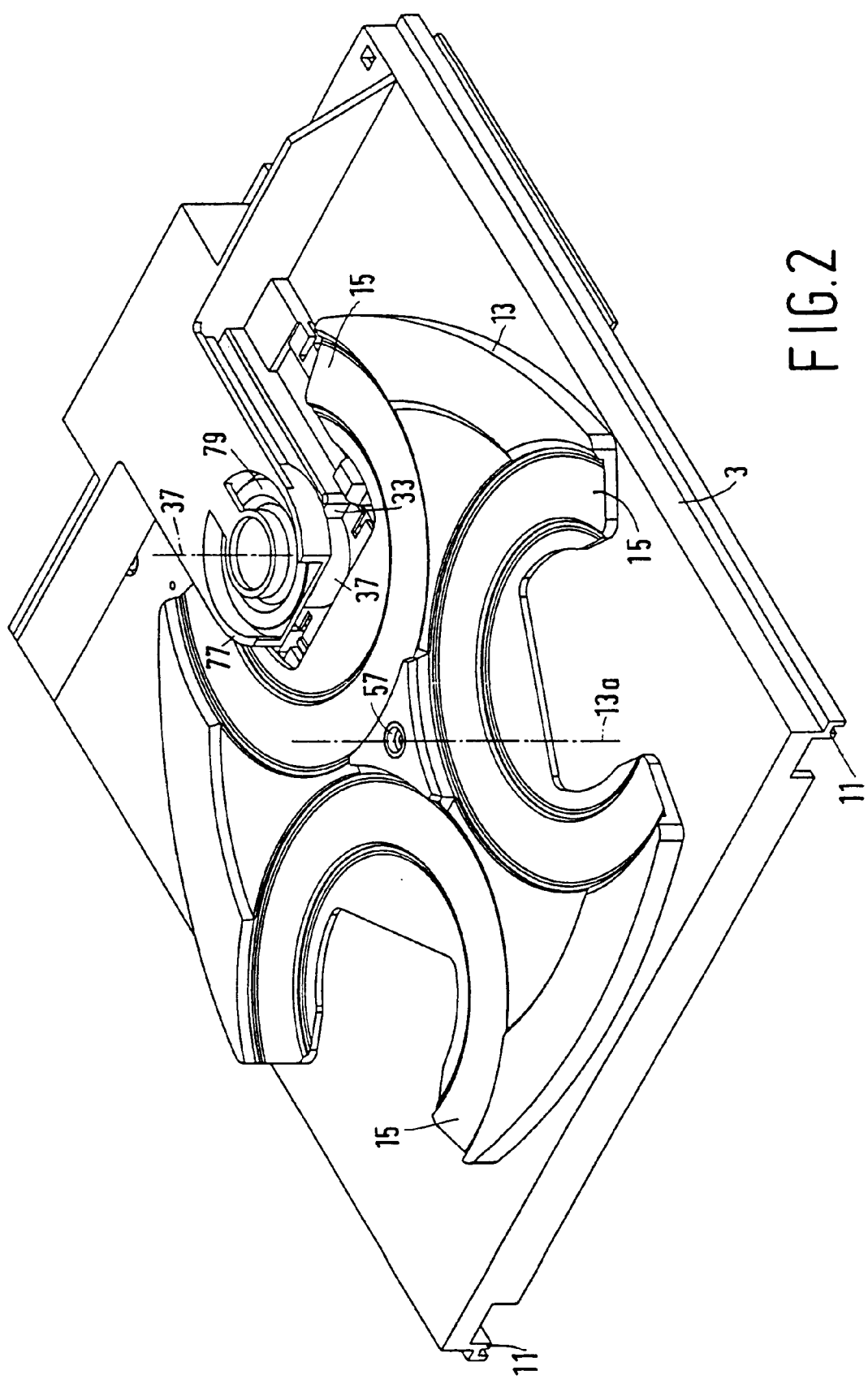
FIG. 2 is a perspective plan view of a part of the disc player shown in FIG. 1.
Figure 3:
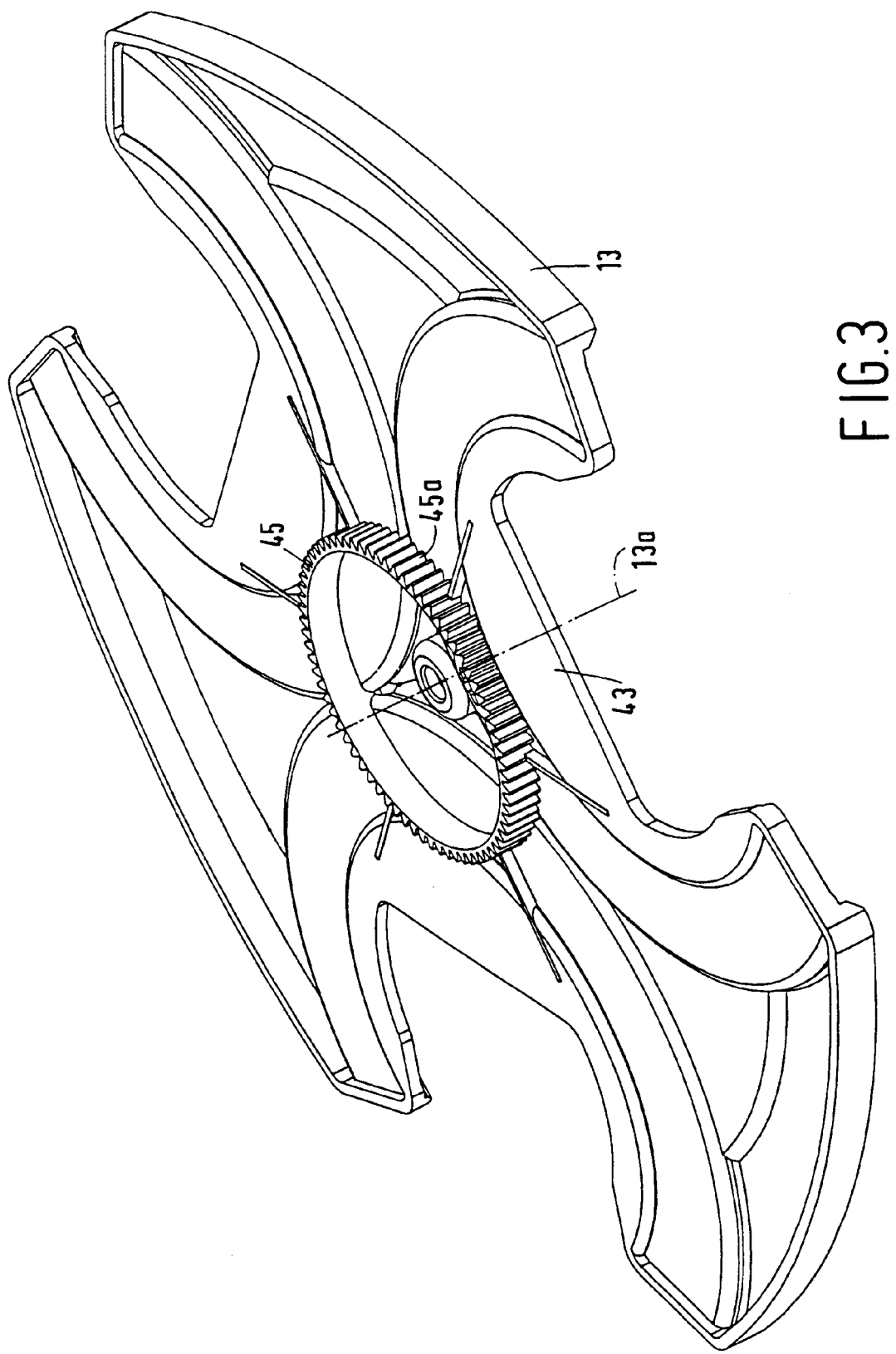
FIG. 3 is a perspective underneath view of a disc support forming part of the disc changer of the disc player shown in FIG. 1.
Figure 4:
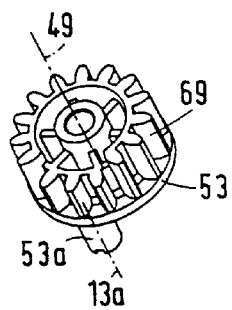
FIG. 4 is an underneath view of a drive member forming part of the disc changer of the disc player shown in FIG. 1.
Figure 5:
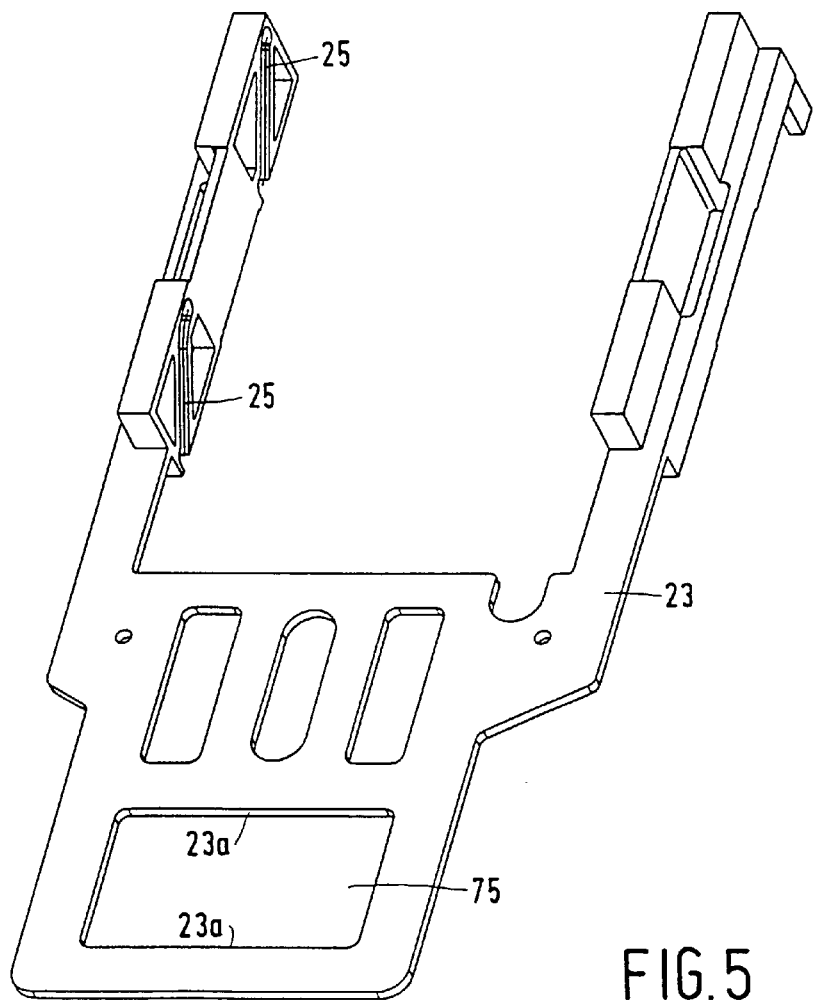
FIG. 5 is a perspective plan view of a slide member forming part of the disc player shown in FIG. 1.
Figure 6:
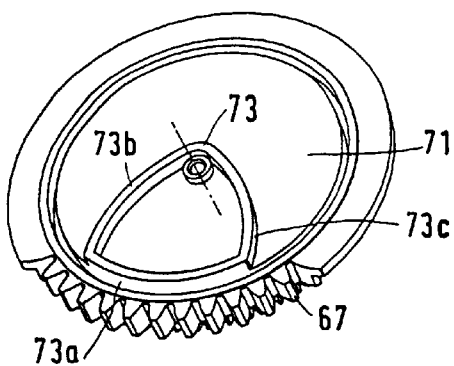
FIG. 6 is an underneath view of a command disc adapted to cooperate with the slide member of the disc player shown in FIG. 1.

The embodiment of the disc player in accordance with the invention shown in FIGS. 1 to 6 comprises a frame 1 secured in a housing 1a and a drawer 3 which is movably supported relative to the frame. The frame 1 comprises a toothed rack 5 for cooperation with a toothed wheel 7 to move the drawer 3 into and out of the housing 1a. The frame further comprises two guideways 9 for cooperation with two guide rails 11 of the drawer 3. The drawer 3 serves as a supporting body for a disc-shaped disc support 13 which is rotatable about an axis of rotation 13a. In the present example the disc support 13 has three supporting surfaces 15 for disc-shaped information carriers, such as CDs. A drive system 17 is secured to a side of the drawer 3 which is remote from the disc support 13, i.e. the underside, which system comprises an electric motor 19, a command disc 21 and a slide member 23. The slide member 23 has four inclined grooves 25 engaged by four guide pins 27 of a chassis 29. The chassis 29 carries a scanning device 33 via four suspension elements 31. The scanning device 33 comprises a turntable 37, which is rotatable about an axis of rotation 37a by means of an electric motor 35, and an optical scanning unit 39, which is radially movable relative to the turntable 37. The optical scanning unit 39 comprises an objective lens 41 for focusing a scanning beam onto a scanning surface of an information disc. The scanning device 33 further comprises elements not shown in the drawings, such as a radiation source and a radiation-sensitive detector.

At its side 43 facing the drawer 3 the disc support 13 has a toothed ring 45, also referred to as the first toothed ring 45, which is concentric with the axis of rotation 13a and has outer teeth 45a. The drawer 3 has a substantially central opening 47 and has a toothed ring 51, which is concentric with an axis 49 which extends through the opening 47. The toothed ring 51, also referred to as the second toothed ring 51, has inner teeth 51a. A drive member 53, which is rotatable about the axis 49, is disposed in the opening 47. The drive member 53 is supported in a mounting plate 55 of the drive system 17 and comprises a drive pin 53a. The drive pin 53a extends into or through a central opening 57 in the disc support 13, the disc support being rotatable relative to the pin 53a. The drive pin 53a has a central axis which coincides with the axis of rotation 13a. In the assembled condition, which is the condition on which the entire description is based, the outer teeth 45a of the first toothed ring 45 are in mesh with the inner teeth 51a of the second toothed ring 51. The number of outer teeth 45a is in a ratio of 3:4 to the number of inner teeth 51a. The axis of rotation 13a of the disc support 13 is situated at a distance d from the axis 49 of the drawer 3, which distance d is equal to half the difference between the pitch diameters of the toothed rings 45 and 51. In the present example both toothed rings 45 and 51 have straight teeth. It is taken to be common knowledge that pitch circles of two meshing toothed rings or, generally speaking, toothed wheels are imaginary circles which are in contact with one another and along which the toothed rings or wheels mesh with one another. In the present embodiment the number of outer teeth 45a is seventy-two and the number of inner teeth 51a is ninety-six.

The disc changer in accordance with the invention comprises an electric motor 59, which is secured to the underside of the drawer 3 by means of a mounting plate 61. The electric motor 59 is coupled to the driving wheel 7 via a belt/toothed-wheel transmission 63, which driving heel is in mesh with the toothed rack 5 of the frame 1. When the electric motor 59 is energised the drawer 3 can be translated relative to the frame 1 as indicated by the double arrow x, to move the disc support 13 into or out of the housing 1a.

A belt/toothed-wheel transmission 65 couples said electric motor 19 to a toothed wheel 21a of the command disc 21. Along a part of its circumference the command disc 21 has teeth 67 for cooperation with teeth 69 of the drive member 53. At one side 71, i.e. the underside, the command disc 21 carries a triangular drive profile 73, which engages in a rectangular opening 75 in the slide member 23. The drive profile 73 has three outer walls 73a, 73b and 73c for cooperation with the inner walls 23a which bound the opening 75 in the slide member 23. These elements are arranged and dimensioned in such a manner that in the case of an information disc which is in a scanning position, i.e. which is situated on the turntable 37, energisation of the electric motor 19 causes the slide member 3 to be moved in a direction $x_1$ relative to the mounting plate 17 in order to move the scanning device 33 in a direction $y_1$ which is oriented transversely thereto. After this movement the information disc initially situated on the turntable 37 will be situated on one of the supporting surfaces 15 of the disc support 13. When the energisation of the electric motor 19 continues the teeth 67 of the command disc 21 come into mesh with the teeth 69 of the drive member 53 and the drive member 53 is rotated about the axis 49, the drive member 53 making exactly one revolution during meshing. During this revolution the disc support 13 is moved and is rotated through and angle of 120° about the axis of rotation 13a. In the position of the disc support 13 then reached another supporting surface 15 is again in register with the turntable 37. When the energisation of the electric motor 19 continues the slide member 23 is moved in a direction $x_2$, the scanning device 33 being guided so as to move in a direction $y_2$. During the last-mentioned movement an information disc lying on the supporting surface 15 of the disc support 13 which is in register with the turntable 37 is lifted by the turntable 37 to bring the information disc in the scanning position. The above cycle is repeated when the energisation of the electric motor 19 is continued. The drive member 53 and the scanning device 33 are thus driven and moved intermittently.

It is to be noted that the present disc player comprises a disc-pressure device 77 with a disc pressure member 79 for clamping an information disc onto the turntable 37 in the scanning position.

Figure 7:
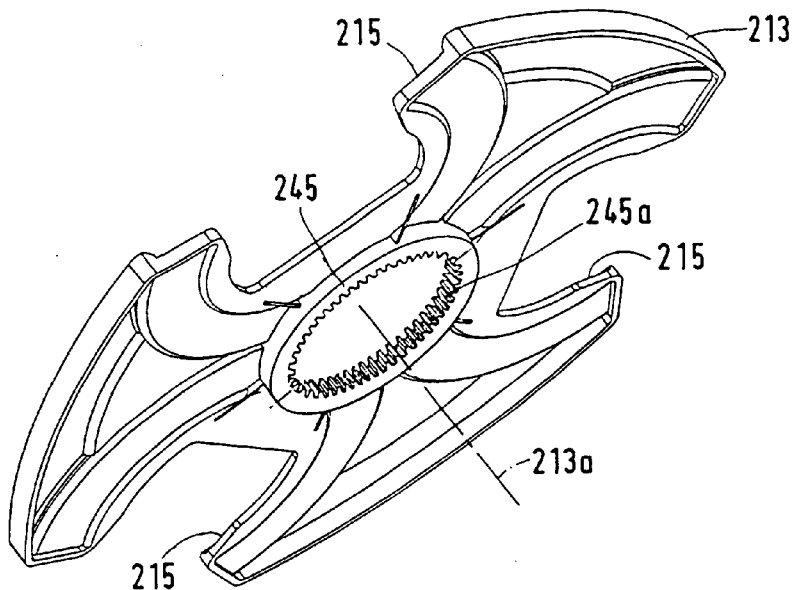
FIG. 7 is a perspective underneath view of a disc support forming part of a second embodiment of the disc changer in accordance with the invention.
Figure 8:
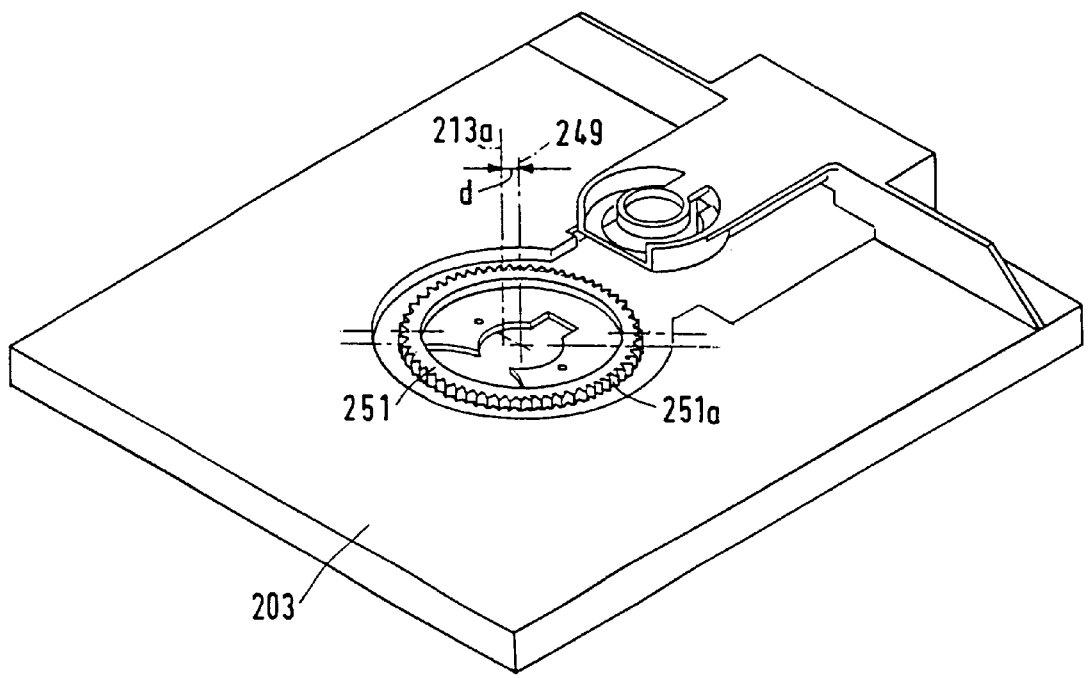
FIG. 8 is a perspective plan view of a supporting body forming part of the second embodiment.

The embodiment of the disc changer in accordance with the invention shown in FIGS. 7 and 8 can accept a maximum of three optically scanned disc-shaped information carriers. For this purpose, the changer has three supporting surfaces 215 provided on a disc support 213. The disc support 213 is arranged on a supporting body 203 with an imaginary axis 249c and is rotatable relative to the body 203 about an axis of rotation 213a, which extends parallel to the axis 249 and can rotate around this axis 249.

Similarly to the disc changer used in the disc player shown in FIGS. 1 to 6 the present disc changer comprises a drive member which is rotatable about the axis 249 of the supporting body 203 and which is rotatably coupled to the disc support 13 at the location of the axis of rotation 213a. The disc support 213 itself has a first toothed ring 245, which is concentric with the axis of rotation 245 and which has inner teeth 245a, which mesh with outer teeth 251a of a second toothed ring 251, which forms part of the supporting body 203 and is concentric with the axis 249. The ratio between the number of inner teeth 245a and the number of outer teeth 251a is 3:2. The axis of rotation 213a and the axis 249 are situated at a distance d from one another, which distance is equal to the difference between the pitch radii of the toothed rings 245 and 251. The disc changer operates in the same way as the changer already described. In the case of said ratio the disc support of the disc changer shown in FIGS. 7 and 8 particularly performs one third revolution about the moving axis of rotation 213a for one revolution of the drive member, as a result of which the disc support assumes accurately pre-defined positions, only a limited area being required to perform the movements between the positions.

Figure 9:
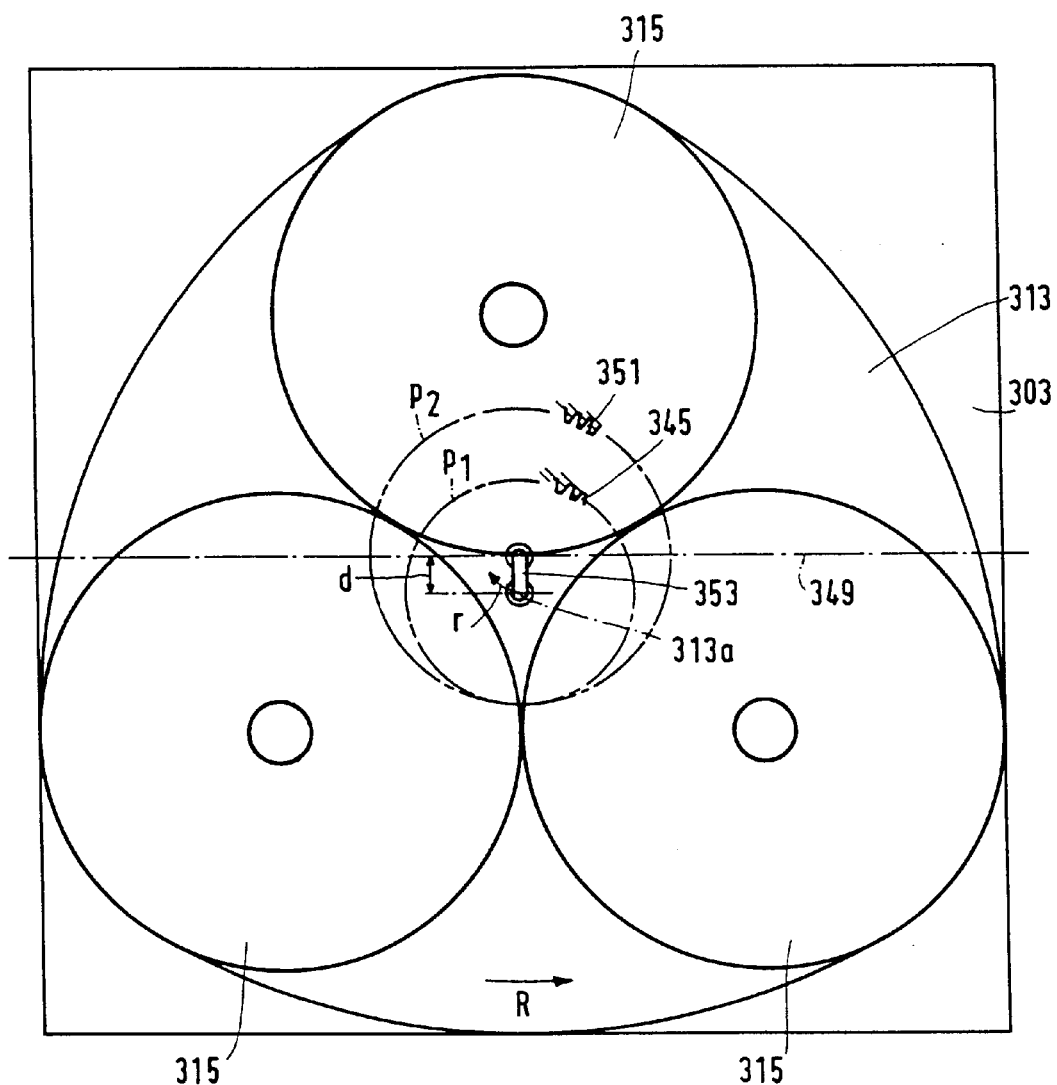
FIG. 9 is a perspective plan view of a third embodiment of the disc changer in accordance with the invention.
Figure 10:
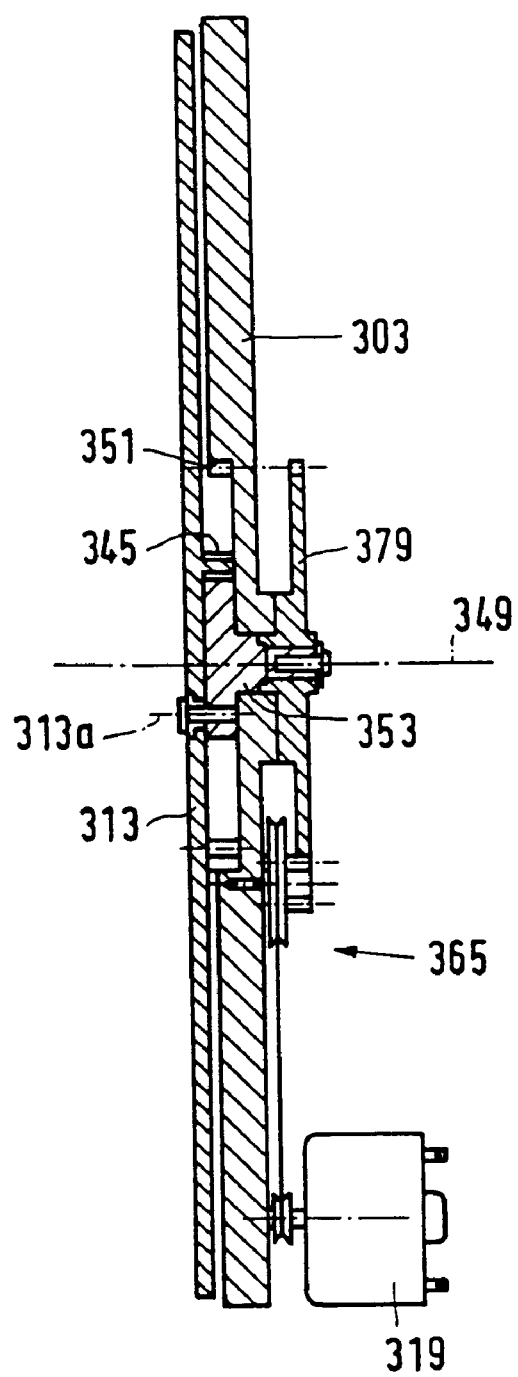
FIG. 10 shows the third embodiment in a partly cross-sectional view.

The embodiment of the disc changer in accordance with the invention shown in FIGS. 9 and 10 is intended for bringing disc-shaped information carriers such as CDs or CD-ROMs into or out of positions related to a scanning position. the disc changer comprises a supporting body 303, for example in the form of a plate-shaped frame which may be mounted in a housing, and a disc-shaped disc support 313 supported by the supporting body 303. The disc support 313 has three supporting surfaces 315, which are each adapted to support an information disc and which are arranged in such a manner relative to one another that the disc support has minimal radial dimensions. The disc support 313 is rotatable about an axis of rotation 313a relative to the supporting body 303 and can be translated in a plane transverse to the axis of rotation 313a. The disc changer further comprises a drive member 353, which is rotatably coupled to the disc support 313 at the location of the axis of rotation 313a. The drive member 353, which serves for rotating and guiding the disc support 313, is supported in the supporting body 303 is rotatable relative to this body about an axis 349 of the supporting body. The disc changer has two toothed rings, a first toothed ring 345 being fixedly secured to the disc support 313 and a second toothed ring 351 being fixedly secured to the supporting body 303. The first toothed ring 345, which has outer teeth, is situated within and is in mesh with the second toothed ring 351, which has inner teeth. The first toothed ring 345 has a pitch circle $p_1$ and the second toothed ring 351 has a pitch circle $p_2$. When the drive member 353 is rotated about the axis 349 in the direction r, the two pitch circles $p_1$ and $p_2$ roll in contact, the disc support 313 being moved and rotating in the direction R about the axis of rotation 313a which moves along with the disc support.

In order to achieve that the disc support 313 with the three supporting surfaces 315 revolves within a minimal space in a manner as described above, the first toothed ring 345 has in the present example fifty-seven teeth and the second toothed ring 351 has seventy-six teeth. The axis of rotation 313a is situated at a distance d from the axis 349, which distance is equal to half the difference between the pitch diameters $p_2$ and $p_1$. After one full revolution of the drive member 353 the disc support 313 has performed exactly one third revolution. It is obvious that different numbers of teeth may be chosen within the scope defined by the invention that the number of outer teeth should be in a ratio of 3:4 to the number of inner teeth.

The disc changer further comprises an electric motor 319 for driving the drive member 353. A transmission mechanism 365, in the present example a belt/toothed wheel transmission, couples the electric motor 319 to a toothed wheel 379 secured to the drive member 353.

What is claimed is:
1. A disc changer for bringing disc-shaped information carriers into and out of a position, comprising:
   a supporting body;
   a disc-shaped disc support, which is supported by the supporting body, is arranged to be movable relative to the body, is rotatable about an axis of rotation, and has supporting surfaces for the information carriers;
   a first toothed ring of the disk support which extends around the axis of rotation of the disk support and is rotatively fixed with respect to the disc support to prevent rotation relative to the disc support;

a second toothed ring of the support body in mesh with the first toothed ring, rotatively fixed with respect to the supporting body to prevent rotation with respect to the supporting body, and which extends around an axis of the supporting body, which axis of the supporting body extends parallel to and at a distance from the axis of rotation of the disk support; and means for rotating and guiding the disc support with respect to the supporting body and including a drive member which is rotatable about the axis of the supporting body and is rotatably connected to the disk support at the location of the axis of rotation.

2. The disc changer of claim 1, in which the first toothed ring of the disc support has outer teeth and the second toothed ring of the supporting body has inner teeth.

3. The disc changer of claim 2, in which:

the number of outer teeth is in a ratio of 3:4 to the number of inner teeth; and the distance between the axis of rotation of the disc support and the axis of the supporting body is equal to half the difference between the pitch diameters of the two toothed rings.

4. The disc changer of claim 1, in which:

the first toothed ring has inner teeth and the second toothed ring has outer teeth;

the number of inner teeth are in a ratio of 3:2 to the number of outer teeth; and the distance between the axis of rotation of the disc support and the axis of the supporting body is equal to half the difference between the pitch diameters of the two toothed rings.

5. A disc player comprising:

a scanning device having means for inscribing and/or reading disc-shaped information carriers and further having a turntable which is rotatable about an axis of rotation, for supporting an information carrier which is in a scanning position, and a disc changer for moving the information carriers into and out of the position related to the scanning position and including:

a supporting body;

a disc-shaped disc support, which is supported by the supporting body, is arranged to be movable relative to the body, is rotatable about an axis of rotation, and has supporting surfaces for the information carriers;

a first toothed ring of the disk support which extends around the axis of rotation of the disk support and is rotatively fixed with respect to the disc support to prevent rotation relative to the disc support;

a second toothed ring of the support body in mesh with the first toothed ring, rotatively fixed with respect to the supporting body to prevent rotation with respect to the supporting body, and which extends around an axis of the supporting body, which axis of the supporting body extends parallel to and at a distance from the axis of rotation of the disk support; and means for rotating and guiding the disc support with respect to the supporting body and including a drive member which is rotatable about the axis of the supporting body and is rotatably connected to the disk support at the location of the axis of rotation.

6. The disc player of claim 5, in which the supporting body of the disc changer forms part of a drawer which is movable into and out of a housing.

7. The disc player of claim 5 in which the disc support of the disc changer has three supporting surfaces.

8. The disc player of claim 6 in which the disc support of the disc changer has three supporting surfaces.

* * * * *